US012607769B2

(12) United States Patent
Wang et al.

(10) Patent No.: US 12,607,769 B2
(45) Date of Patent: Apr. 21, 2026

(54) PHOTOELECTRIC SENSOR

(71) Applicant: LITE-ON TECHNOLOGY CORPORATION, Taipei City (TW)

(72) Inventors: Sheng-Yun Wang, New Taipei City (TW); Chen-Hsiu Lin, New Taipei City (TW); Bo-Jhih Chen, New Taipei City (TW)

(73) Assignee: LITE-ON TECHNOLOGY CORPORATION, Taipei City (TW)

( * ) Notice: Subject to any disclaimer, the term of this patent is extended or adjusted under 35 U.S.C. 154(b) by 136 days.

(21) Appl. No.: 18/601,969

(22) Filed: Mar. 11, 2024

(65) Prior Publication Data

US 2024/0345284 A1 Oct. 17, 2024

Related U.S. Application Data

(60) Provisional application No. 63/459,378, filed on Apr. 14, 2023.

(30) Foreign Application Priority Data

Nov. 3, 2023 (CN) .......................... 202311452174.7

(51) Int. Cl.
*G01V 8/12* (2006.01)

(52) U.S. Cl.
CPC ...................................... *G01V 8/12* (2013.01)

(58) Field of Classification Search
CPC ....................................................... G01V 8/12
See application file for complete search history.

(56) References Cited

U.S. PATENT DOCUMENTS 5,285,085 A * 2/1994 Onishi .................... H10F 55/20
257/E31.103
2005/0056796 A1* 3/2005 Takeuchi ............. H03K 17/941
250/551

(Continued)

FOREIGN PATENT DOCUMENTS

CN 206074406 U 4/2017
CN 108548501 A 9/2018

(Continued)

OTHER PUBLICATIONS

Omron, "Photomicrosensor Basics: Introduction", https://web.archive. org/web/20220705115844/https://components.omron.com/eu-en/ products/basic-knowledge/sensors/photomicro-sensors/basics.

(Continued)

*Primary Examiner* — Georgia Y Epps
*Assistant Examiner* — Monica T Taba
(74) *Attorney, Agent, or Firm* — Li & Cai Intellectual Property Office

(57) ABSTRACT

The photoelectric sensor includes a housing, a light-emitting module, a light-receiving module, and two adhesive members. The housing includes a first upright portion, a second upright portion, and a base. The first upright portion and the second upright portion are connected to the base, the first upright portion has a first concave structure and a first opening, and the second upright portion has a second concave structure and a second opening. The light-emitting module includes a first circuit board and a light-emitting element and is embedded in the first concave structure. The light-emitting element corresponds to the first opening. The light-receiving module includes a second circuit board and a light-receiving element and is embedded in the second concave structure. The light-receiving element corresponds to the second opening. The two adhesive members are (Continued)

respectively provided on side walls of the first concave structure and the second concave structure.

17 Claims, 13 Drawing Sheets

(56) References Cited

U.S. PATENT DOCUMENTS

2009/0128794 A1* 5/2009 Matsuyama ......... H03K 17/941
                                              355/67
2010/0032592 A1* 2/2010 Kinoshita ............... H10F 77/50
                                              156/60
2012/0138777 A1* 6/2012 Larson ...................... G01J 1/18
                                              250/214.1

FOREIGN PATENT DOCUMENTS

CN        218512656 U    2/2023
TW          I474498 B    2/2015
TW        202235988 A    9/2022

OTHER PUBLICATIONS

Omron, "Catalog of EE-SX4330", https://www.fa.omron.co.jp/
products/family/3898/download/catalog.html.

* cited by examiner

124S

~124L

PHOTOELECTRIC SENSOR

CROSS-REFERENCE TO RELATED PATENT APPLICATION

This application claims the benefit of priority to China Patent Application No. 202311452174.7, filed on Nov. 3, 2023, in the People's Republic of China. The entire content of the above identified application is incorporated herein by reference.

This application claims the benefit of priority to the U.S. Provisional Patent Application Ser. No. 63/459,378, filed on Apr. 14, 2023, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a photoelectric sensor, and more particularly to a through-beam photoelectric sensor.

BACKGROUND OF THE DISCLOSURE

Existing through-beam photoelectric sensors have a structure including a plastic housing, a light-emitting element, and a light-receiving element. The light-emitting element and the light-receiving element are respectively adhered to outermost surfaces of two lateral sides of the plastic housing. In the manufacturing process of the existing through-beam photoelectric sensors, the photoelectric sensors are usually manufactured in multiple units at the same time. For example, a circuit board having the light-emitting elements and the light-receiving elements is attached to multiple continuous plastic housings at the same time, and then the circuit board and the continuous plastic housings that are assembled are sawed to form multiple photoelectric sensors. However, the manufacturing process of such photoelectric sensors is cumbersome and lengthy, and does not facilitate cost reduction.

SUMMARY OF THE DISCLOSURE

In response to the above-referenced technical inadequacies, the present disclosure provides a through-beam photoelectric sensor to address the issue of an existing photoelectric sensor having a complex manufacturing process that incurs high manufacturing costs.

In order to solve the above-mentioned problems, one of the technical aspects adopted by the present disclosure is to provide a photoelectric sensor. The photoelectric sensor includes a housing, a light-emitting module, a light-receiving module, and two adhesive members. The housing includes a first upright portion, a second upright portion, and a base. The base is connected to the first upright portion and the second upright portion, the first upright portion has a first concave structure and a first opening, and the second upright portion has a second concave structure and a second opening. The light-emitting module includes a first circuit board and a light-emitting element. The light-emitting module is embedded in the first concave structure, and the light-emitting element corresponds to the first opening. The light-receiving module includes a second circuit board and a light-receiving element. The light-receiving module is embedded in the second concave structure, and the light-receiving element corresponds to the second opening. The two adhesive members are respectively provided on side walls of the first concave structure and the second concave structure, so as to respectively bond the light-emitting module into the first concave structure and the light-receiving module into the second concave structure.

Therefore, in the photoelectric sensor provided by the present disclosure, by forming a first concave structure and a second concave structure in the housing, the light-emitting module and the light-receiving module can be respectively embedded in the first concave structure and the second concave structure; and the light-emitting module and the light-receiving module can be bonded into the first and second concave structures by using adhesive members. The photoelectric sensor of the present disclosure can have improved structural strength compared to the existing photoelectric sensor. Furthermore, in the photoelectric sensor of the present disclosure, the light-emitting module and the light-receiving module are respectively embedded in the first concave structure and the second concave structure without sawing the housing. Each housing of the photoelectric sensor of the present disclosure has been singularized before assembling with the circuit board. Therefore, a manufacturing time can be shortened and a manufacturing cost can be saved.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
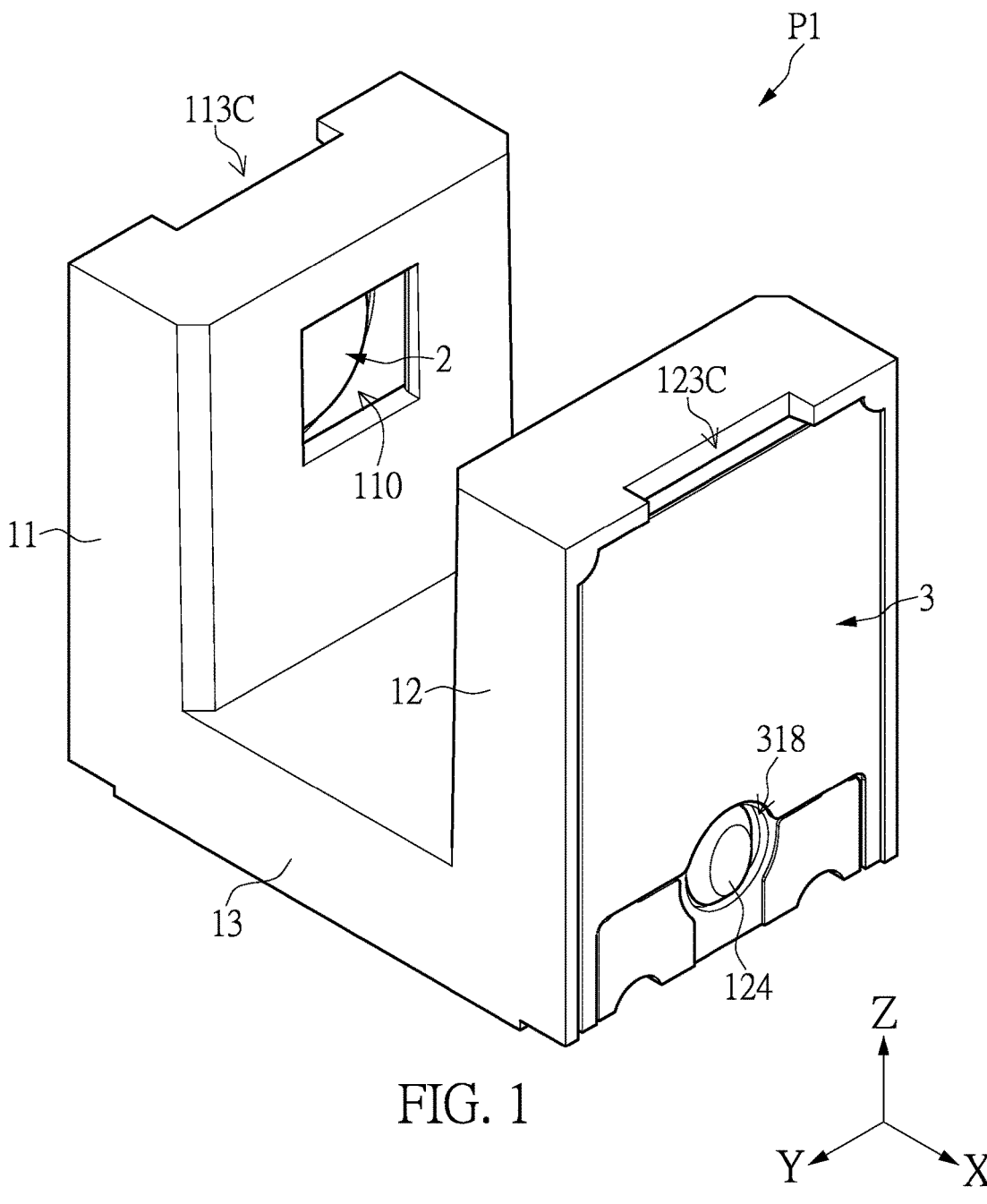
FIG. 1 is a schematic view of a photoelectric sensor according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 2:
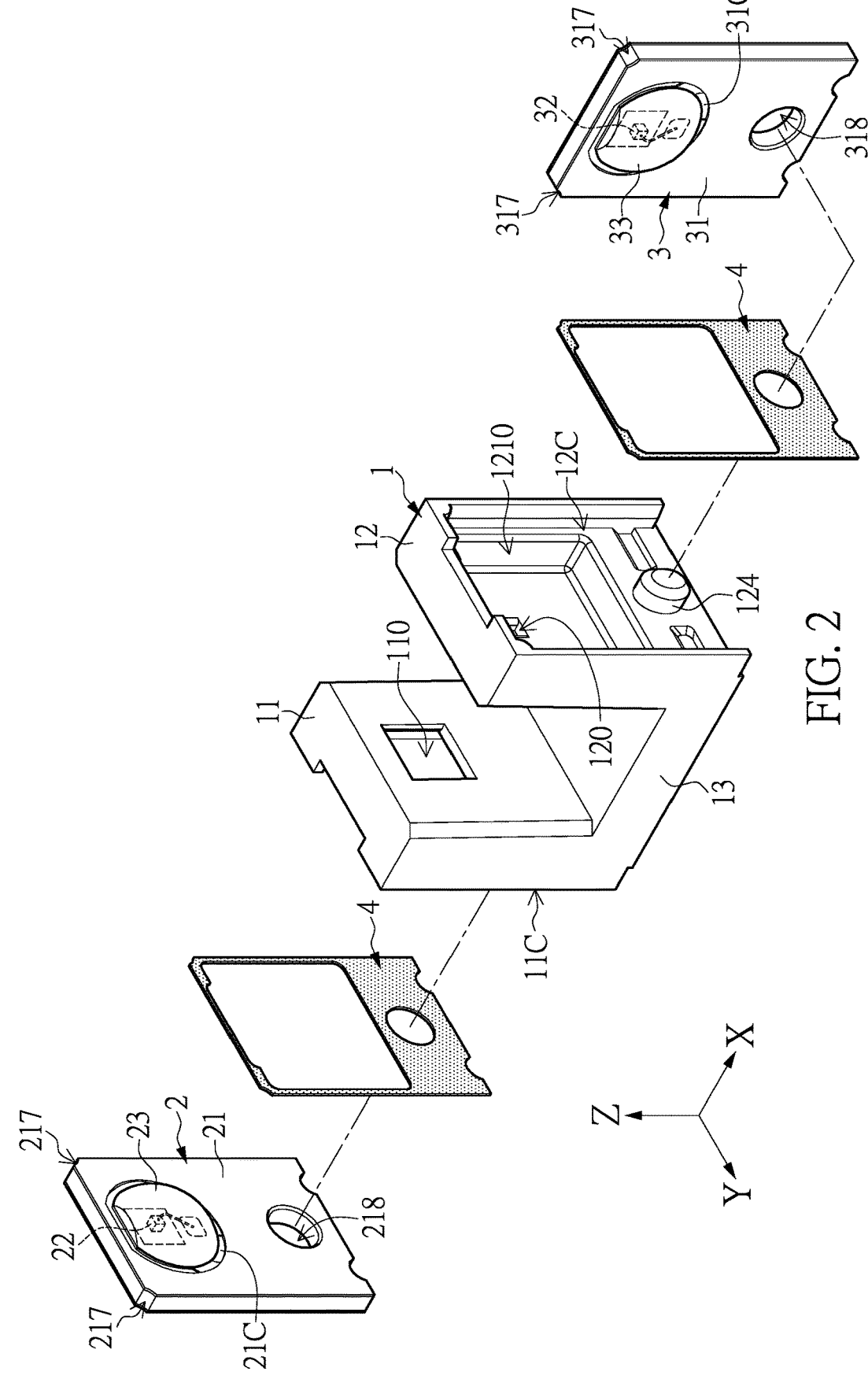
FIG. 2 is an exploded view of the photoelectric sensor according to the first embodiment of the present disclosure.

Referring to FIG. 1 and FIG. 2, FIG. 1 is a schematic view of a photoelectric sensor according to a first embodiment of the present disclosure, and FIG. 2 is an exploded view of the photoelectric sensor according to the first embodiment of the present disclosure. The present disclosure provides a photoelectric sensor P1. The photoelectric sensor P1 includes a housing 1, a light-emitting module 2, a light-receiving module 3, and two adhesive members 4.

The housing 1 includes a first upright portion 11, a second upright portion 12, and a base 13. The base 13 is connected to the first upright portion 11 and the second upright portion 12, such that the housing 1 is U-shaped. The first upright portion 11 has a first concave structure 11C and a first opening 110, and the second upright portion 12 has a second concave structure 12C and a second opening 120. In this embodiment, a size of the first opening 110 is greater than a size of the second opening 120.

Comparing to the existing technology, the housing 1 of the present disclosure is a single object in an assembly process described below. Therefore, the housing 1 is not required to be divided through processes such as sawing, such that manufacturing time and cost can be effectively reduced. Preferably, the housing 1 of the present disclosure is made by injection-molding, but the present disclosure is not limited thereto. Furthermore, the housing 1 can also be manufactured through techniques that are commonly utilized in the industry.

The light-emitting module 2 and the light-receiving module 3 are respectively disposed in the first concave structure 11C and the second concave structure 12C. Specifically, the light-emitting module 2 includes a first circuit board 21 and a light-emitting element 22 that is disposed on the first circuit board 21. The first circuit board 21 is embedded in the first concave structure 11C, and the light-emitting element 22 corresponds to the first opening 110. The light-receiving module 3 includes a second circuit board 31 and a light-receiving element 32 that is disposed on the second circuit board 31. The second circuit board 31 is embedded in the second concave structure 12C, and the light-receiving element 32 corresponds to the second opening 120. By the design of the first opening 110 being greater than the second opening 120, a light-receiving accuracy of the light-receiving element 32 can be improved. Furthermore, judging from the size differences of the first opening 110 and the second opening 120, a user can confirm the allocations of the light-emitting module 2 and the light-receiving module 3, respectively.

As shown in FIG. 2, the two adhesive members 4 are respectively provided on side walls 121 of the first concave structure 11C (due to the limitation of the perspective of FIG. 2, the side wall 121 of the first concave structure 11C is not shown in FIG. 2) and the second concave structure 12C to respectively bond the light-emitting module 2 into the first concave structure 11C and the light-receiving module 3 into the second concave structure 12C. In detail, the two adhesive members 4 are respectively adhered between the side wall 121 of the first concave structure 11C and the first circuit board 21 of the light-emitting module 2, and between the side wall 121 of the second concave structure 12C and the second circuit board 31 of the light-receiving module 3. In the photoelectric sensor of the existing technology, a circuit board is adhered to an outermost surface of a wall of a housing, such that an area to apply the adhesive member between the housing and the circuit board is limited. In this embodiment, by concave structures being formed at a housing and circuit boards being embedded in the concave structures, an area to apply the adhesive member between the housing and the circuit board can be increased, such that adhesion strength is improved.

Furthermore, as shown in FIG. 2, the light-emitting module 2 further includes a first light-permeable element 23. The first light-permeable element 23 is disposed on the first circuit board 21 and covers the light-emitting element 22. The light-receiving module 3 includes a second light-permeable element 33. The second light-permeable element 33 is disposed on the second circuit board 31 and covers the light-receiving element 32. For example, the first light-permeable element 23 and the second light-permeable element 33 are made from light-permeable resin. The light-emitting element 22 can emit a light beam. The light beam penetrates through the first light-permeable element 23, passes through the first opening 110 and the second opening 120 to enter the second light-permeable element 33, and is then received by the light-receiving element 32. For example, the light-emitting element 22 can be a light-emitting diode. The light beam can be infrared light, ultraviolet, or a visible light beam, and is more preferably an infrared. The light-receiving element 32 can be a photodetector. Therefore, when an object under detection is interposed between the light-emitting element 22 and the light-receiving element 32, the light beam emitted by the light-emitting element 22 will be blocked by the object under detection, such that an amount of the light beam that is received by the light-receiving element 32 is changed. Therefore, the photoelectric sensor P1 can detect if an object is present for detection.

Figure 3:
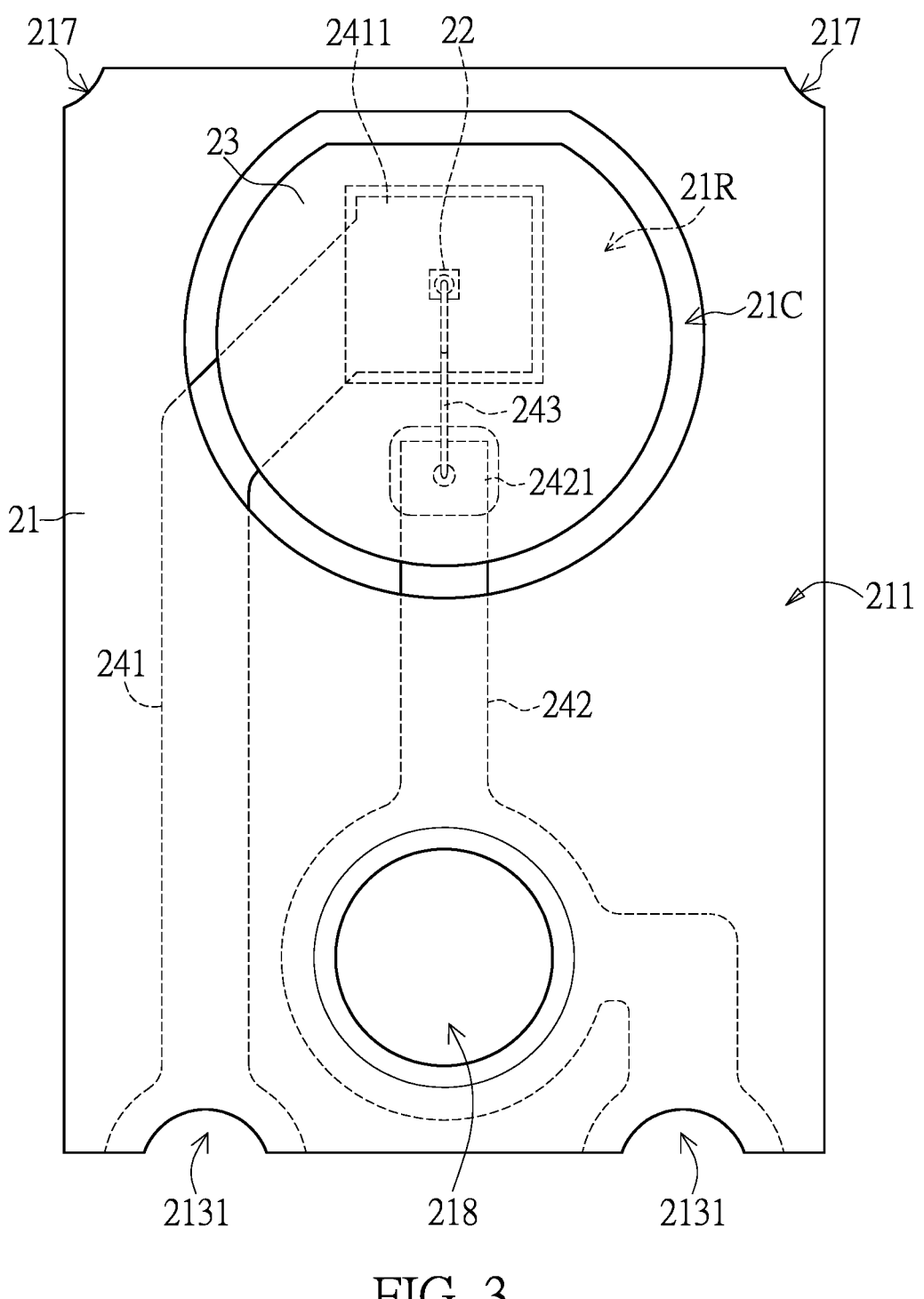
FIG. 3 is a schematic front view of a circuit board according to the first embodiment of the present disclosure.
Figure 4:
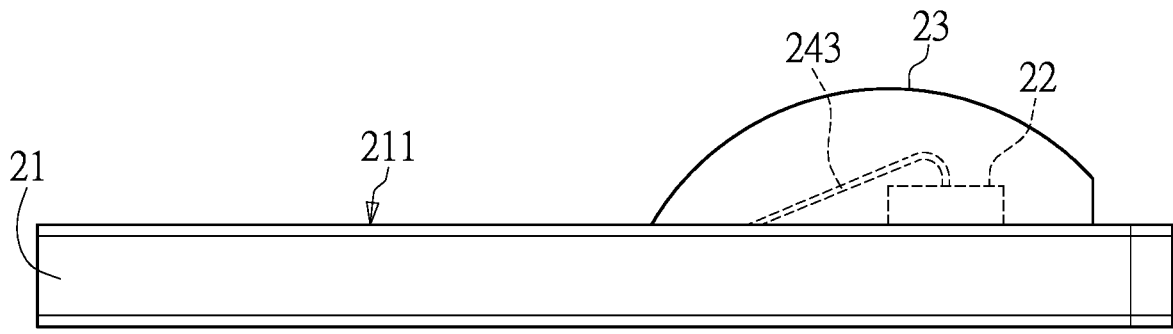
FIG. 4 is a schematic side view of the circuit board according to the first embodiment of the present disclosure.

Referring to FIG. 3 and FIG. 4, FIG. 3 is a schematic front view of a circuit board according to the first embodiment of the present disclosure, and FIG. 4 is a schematic side view of the circuit board according to the first embodiment of the present disclosure. It should be noted that, in the present disclosure, since the light-emitting module 2 and the light-receiving module 3 are structurally similar, only the structure of the light-emitting module 2 or the structure of the light-receiving module 3 is exemplified below for ease of description.

As shown in FIG. 2 to FIG. 4, the first circuit board 21 has an annular slot 21C. The annular slot 21C surrounds the light-emitting element 22 to form a limiting region 21R, and the first light-permeable element 23 is located in the limiting region 21R. Similarly, the second circuit board 31 has an annular slot 31C. The annular slot 31C surrounds the light-receiving element 32 to form a limiting region, and the second light-permeable element 33 is located in the limiting region. Furthermore, in the first circuit board 21, a solder mask layer is coated on a first surface 211 of the first circuit board 21, and the annular slot 21C is a slot formed by the solder mask layer (same for the annular slot 31C). By the design of annular slots, a light-permeable resin that forms light-permeable elements (e.g., the first light-permeable element 23 and the second light-permeable element 33) can be congregated in the limiting region and does not overflow to other regions of a circuit board. Furthermore, in the present disclosure, the annular slots can be used to congregate the light-permeable resin in the limiting region, such that a light-permeable element forms a lens structure, and the light beam emitted by the light-emitting element 22 can be concentrated by the refraction of the lens structure to have a smaller area of projection and higher probability of being received by the light-receiving element 32.

Figure 5:
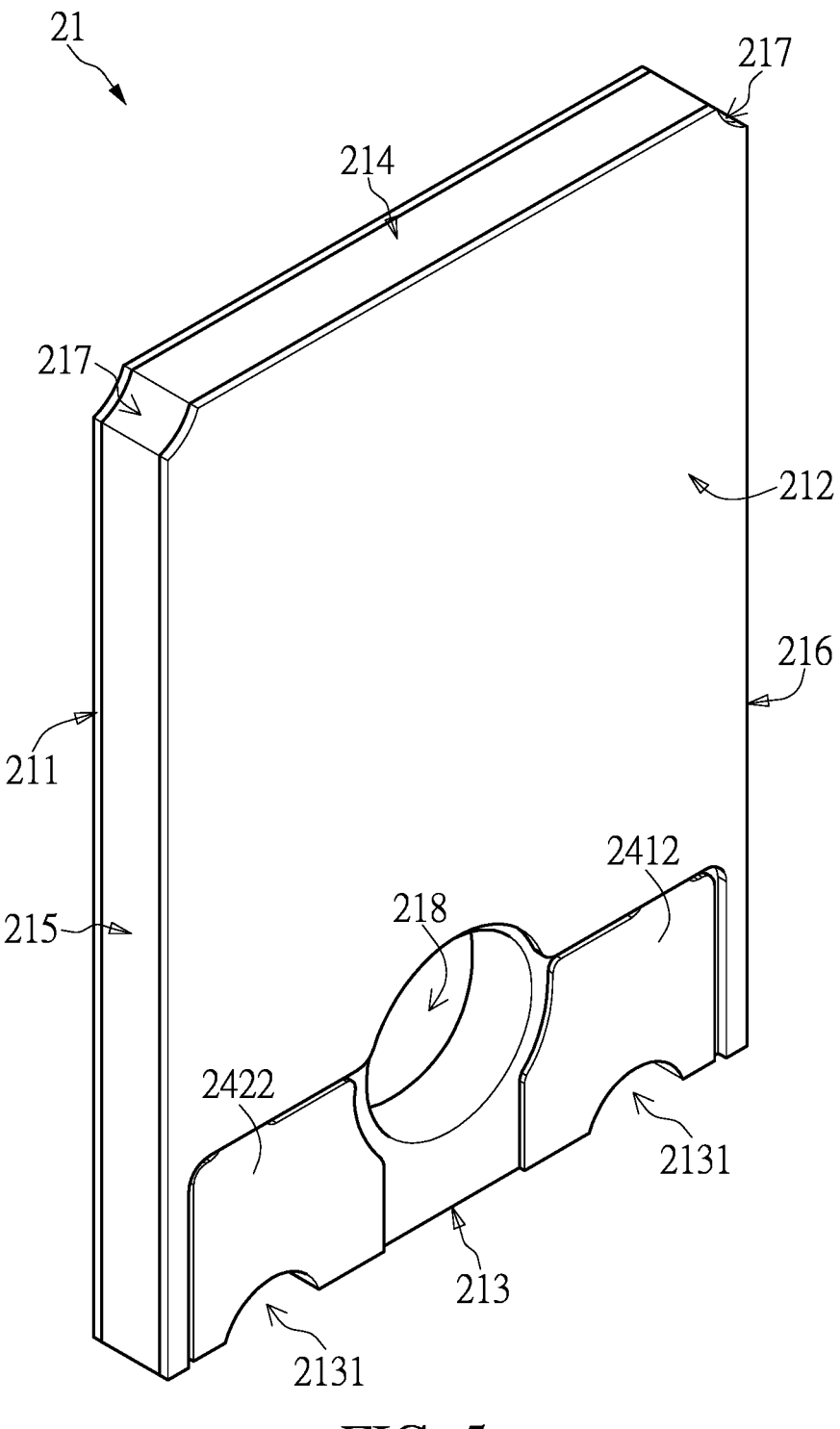
FIG. 5 is a schematic rear view of the circuit board according to the first embodiment of the present disclosure.

Referring to FIG. 3 to FIG. 5, FIG. 5 is a schematic rear view of the circuit board according to the first embodiment of the present disclosure. The structure of the first circuit board 21 is described in detail herein. Because the second circuit board 31 has the same structure as the first circuit board 21, descriptions of the second circuit board 31 are not reiterated herein. The first circuit board 21 has the first surface 211, a second surface 212, a third surface 213, a fourth surface 214, a fifth surface 215, and a sixth surface 216. The first surface 211 and the second surface 212 are located on opposite sides of the first circuit board 21. The third surface 213 is connected between the first surface 211 and the second surface 212. The fourth surface 214 and the third surface 213 are located on opposite sides of the first circuit board 21. The fifth surface 215 and the sixth surface 216 are located on opposite sides of the first circuit board 21. The fourth surface 214 is connected between the fifth surface 215 and the sixth surface 216.

The third surface 213 has two recesses 2131 formed thereon. In addition, two first limiting portions 217 are formed between the fourth surface 214 and the fifth surface 215, and between the fourth surface 214 and the sixth surface 216, respectively. Furthermore, in this embodiment, the first circuit board 21 has a through-hole 218 formed thereon, and the through-hole 218 passes through the first surface 211 and the second surface 212.

Reference is further made to FIG. 3 to FIG. 5, and the first circuit board 21 further includes a first electrically conductive pattern 241 and a second electrically conductive pattern 242. The first electrically conductive pattern 241 and the second electrically conductive pattern 242 are disposed on the first surface 211. A metal pad is formed on a first end 2411 of the first electrically conductive pattern 241, and the light-emitting element 22 is disposed on the metal pad. Specifically, the first end 2411 of the first electrically conductive pattern 241 is electrically connected to one electrode (e.g., a negative electrode) of the light-emitting element 22. A second end 2412 of the first electrically conductive pattern 241 passes through one of the recesses 2131 and covers a surface of the one of the recesses 2131, and then further extends to the second surface 212. A first end 2421 of the second electrically conductive pattern 242 is electrically connected to another electrode (e.g., a positive electrode) of the light-emitting element 22. Specifically, the light-emitting element 22 can be electrically connected to the first end 2421 of the second electrically conductive pattern 242 by a metal wire 243, and the metal wire 243 is wrapped by the first light-permeable element 23. A second end 2422 of the second electrically conductive pattern 242 passes through another one of the recesses 2131 and covers a surface of the another one of the recesses 2131, and then further extends to the second surface 212. When the photoelectric sensor P1 is soldered to an external circuit board, a bottom portion (i.e., the third surface 213) of the first circuit board 21 is soldered to the external circuit board. Therefore, by the design of the recesses 2131, the solder is able to easily extend to a rear side (i.e., the second surface 212) of the first circuit board 21 to increase a soldering area.

Figure 6:
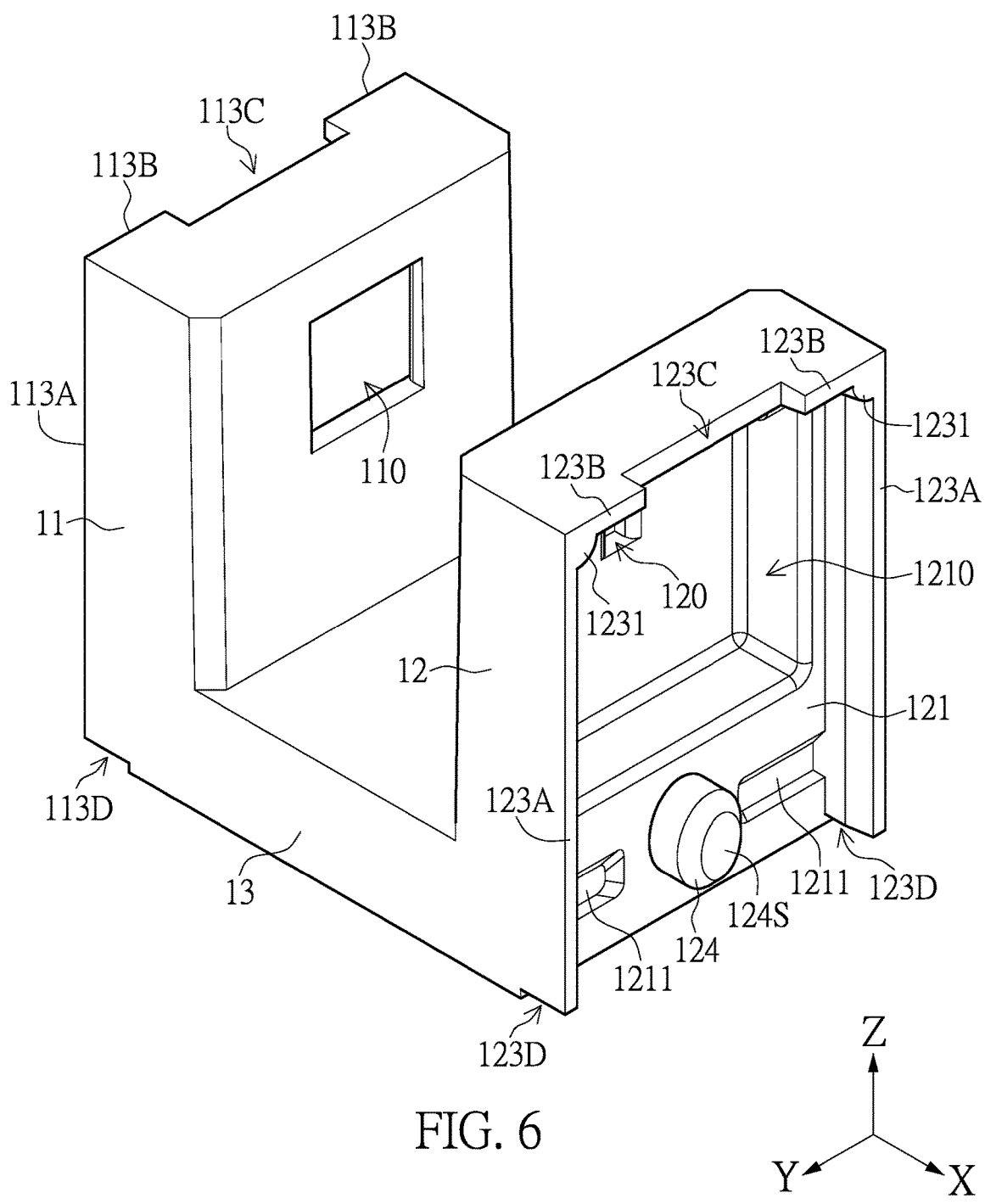
FIG. 6 is a schematic view of a housing according to the first embodiment of the present disclosure.

Referring to FIG. 6, FIG. 6 is a schematic view of a housing according to the first embodiment of the present disclosure. The second concave structure 12C of the housing 1 is further described herein. The second concave structure 12C includes a side wall 121 and an outer wall 123. The outer wall 123 is formed at a periphery of the side wall 121. A second accommodating cavity 1210 is formed in the side wall 121, and the second accommodating cavity 1210 is communicatively connected to the second opening 120. Similarly, the first concave structure 11C also has a side wall and an outer wall 113, and the outer wall 113 has two long portions 113A and a short portion 113B. The side wall of the first concave structure 11C has a first accommodating cavity (not shown in the drawings) that is communicatively connected to the first opening 110. The side wall and the first accommodating cavity are not shown in the figures due to the perspective of FIG. 6. A structure of the first concave structure 11C is similar to that of the second concave structure 12C and is not reiterated herein.

Reference is further made to FIG. 6. The outer wall 123 has two long portions 123A and a short portion 123B. One end of each of the two long portions 123A is connected to the short portion 123B. The short portion 123B is adjacent to a top portion of the housing 1. A notch 123C is formed on the center of the short portion 123B, and the notch 123C divides the short portion 123B into two parts. Similarly, a notch 113C is formed at a corresponding position on the first concave structure 11C, and the notch 113C divides the short portion 113B into two parts. In an assembly process of the photoelectric sensor P1, a jig is required for fine-tuning a position of a circuit board within a concave structure, and a design of a notch enables a convenient insertion of the jig into the concave structure. Therefore, by the design of the notch on the outer wall, the first circuit board 21 and the second circuit board 31 can be more conveniently assembled to the first concave structure 11C and the second concave structure 12C. Furthermore, another end of each of the two long portions 123A and a bottom portion of the housing 1 have a step 123D therebetween. Similarly, the first concave structure has a step 113D on a corresponding position. Because the photoelectric sensor P1 is soldered onto the external circuit board via the base 13, by having the step 113D and the step 123D formed at two sides of the base 13, an amount of solder at the base 13 is increased, and bonding strength between the photoelectric sensor P1 and the external circuit board can be improved.

It should be noted that, in this embodiment, a length of the circuit board is less than or equal to a height of the housing. For example, in the first circuit board of FIG. 5, a length of the first circuit board 21 (i.e., a distance between the third surface 213 and the fourth surface 214) is less than or equal to a height of the housing 1 (i.e., a distance between the bottom portion of the base 13 and a top portion of the first upright portion 11), such that the photoelectric sensor P1 can be prevented from having a tilted structure.

Figure 7:
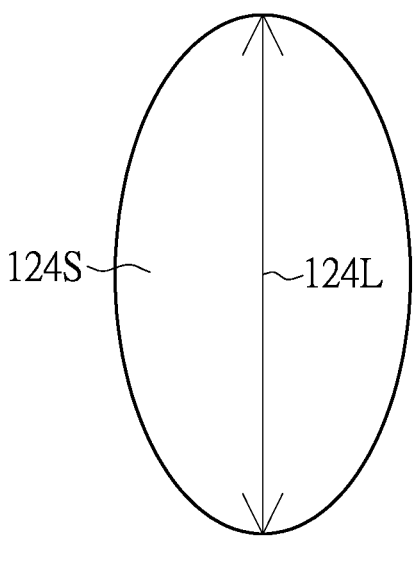
FIG. 7 is a schematic view of a surface of a limiting column of the housing according to the first embodiment of the present disclosure.

Referring to FIG. 6 and FIG. 7, FIG. 7 is a schematic view of a surface of a limiting column of the housing according to the first embodiment of the present disclosure. The second concave structure 12C further includes a limiting column 124, and the limiting column 124 is disposed on the side wall 121. The limiting column 124 is exemplified as an elliptical cylinder. The side wall 121 of the second concave structure 12C further has two slots 1211 formed thereon, and the limiting column 124 is exemplified as being located between the two slots 1211. The limiting column 124 that is an elliptical cylinder has an elliptical surface 124S, and a long axis 124L of the elliptical surface 124S is parallel to the two long portions 123A of the outer wall 123, i.e., parallel to a direction of a Z-axis. In addition, the outer wall 123 has two second limiting portions 1231 formed thereon, and the two second limiting portions 1231 are located at junctions between the two long portions 123A and the short portion 123B. Because the adhesive member 4 is adhered between the side wall 121 of the second concave structure 12C and the second circuit board 31 of the light-receiving module 3, it is difficult to accurately control the amount of adhesive of the adhesive member 4 during the assembly process. Therefore, through the design of the two slots 1211, an excess amount of the adhesive member 4 can be accommodated in the two slots 1211 to avoid overflow of the adhesives.

As shown in FIG. 2 and FIG. 6, when the second circuit board 31 is embedded in the second concave structure 12C, the limiting column 124 is inserted in the through-hole 318 of the second circuit board 31, the two second limiting portions 1231 are respectively engaged with the two first limiting portions 217 of the second circuit board 31, and the second light-permeable element 33 is accommodated in the second accommodating cavity 1210. In the present disclosure, by the design of the limiting column and the two second limiting portions being formed in the concave structure, the circuit board embedded in the concave structure can be fixed in place. Furthermore, in the second concave structure 12C, the two second limiting portions 1231 are mainly used to limit the displacement of the second circuit board 31 in a direction of a Y-axis. The limiting column 124 is designed to be an elliptical cylinder and to have the long axis 124L that is parallel to the Z-axis, so as to limit the displacement of the second circuit board 31 in the direction of the Z-axis. Therefore, when the photoelectric sensor P1 is soldered to an external circuit board, a bottom portion of the second circuit board 31 and the external circuit board can avoid having an excessive distance therebetween that is not conducive for soldering.

It should be noted that, because the through-hole 318 is circular shaped, if the limiting column 124 is also designed as a cylinder, the dimensions of the limiting column 124 (i.e., the diameter of the cylinder) and the dimensions of the through-hole 318 will inevitably be different due to manufacturing tolerances. Therefore, when the limiting column 124 is inserted into the through-hole 318, a gap is present between the limiting column 124 and the through-hole 318, resulting in the second circuit board 31 being unable to be effectively limited by the limiting column 124 and being susceptible to shaking. Therefore, in the present disclosure, the limiting column 124 is designed as an elliptical cylinder, such that a precision tolerance in the direction of the Z-axis is reduced, and the limiting column 124 can at least limit the second circuit board 31 in the direction of the Z-axis.

Figure 8:
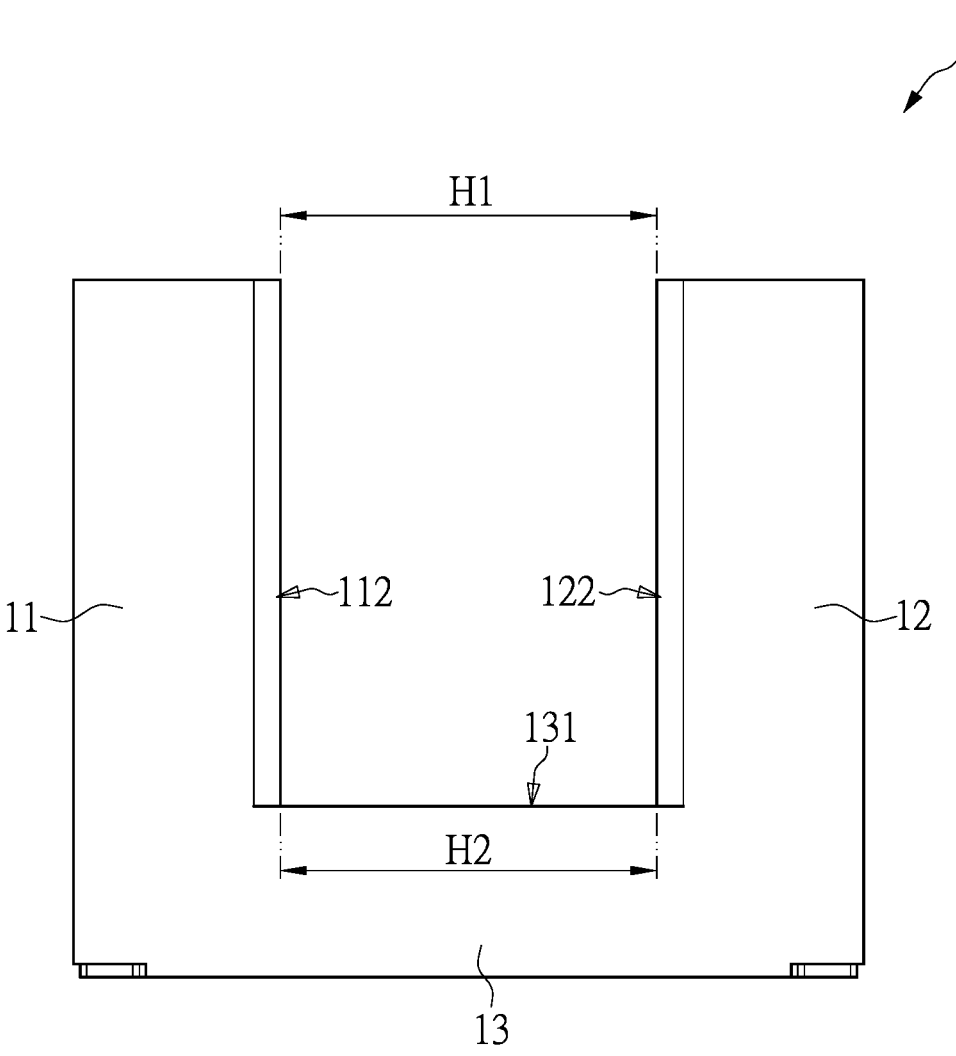
FIG. 8 is a schematic side view of the housing according to the first embodiment of the present disclosure.

Referring to FIG. 6 and FIG. 8, FIG. 8 is a schematic side view of the housing according to the first embodiment of the present disclosure. The first upright portion 11 has a first side surface 112, the second upright portion 12 has a second side surface 122, and the base 13 has a top surface 131. The first side surface 112 and the second side surface 122 face each other. The top surface 131 is connected between the first side surface 112 and the second side surface 122. In the present disclosure, a top end of the first side surface 112 and a top end of the second side surface 122 have a first pitch H1 therebetween, a junction between the first side surface 112 and the top surface 131 and a junction between the second side surface 122 and the top surface 131 have a second pitch H2 therebetween, and the first pitch H1 is equal to the second pitch H2. By the design of the first pitch H1 being equal to the second pitch H2, the first circuit board 21 disposed in the first recess structure 11C and the second circuit board 31 disposed in the second recess structure 12C can be parallel to each other. Therefore, a length of a path of the light beam (the path of the light beam refers to a path of a light beam that is emitted by the light-emitting element 22, travels through the first opening 110, and then enters the second opening 120 to be received by the light-receiving element 32) can be consistent, such that the photoelectric sensor P1 has a fixed sensing distance.

As shown in FIG. 2, when the first circuit board 21 of the light-emitting module 2 and the second circuit board 31 of the light-receiving module 3 are respectively embedded in the first concave structure 11C and the second concave structure 12C, the first circuit board 21 and the second circuit board 31 do not protrude from the first concave structure 11C and the second concave structure 12C. From a side view, an area of the circuit board is not greater than an area of the housing. In addition, as shown in FIG. 8, in a side view of the housing 1, the first circuit board 21 and the second circuit board 31 are completely shielded by the housing 1.

Second Embodiment

Figure 9:
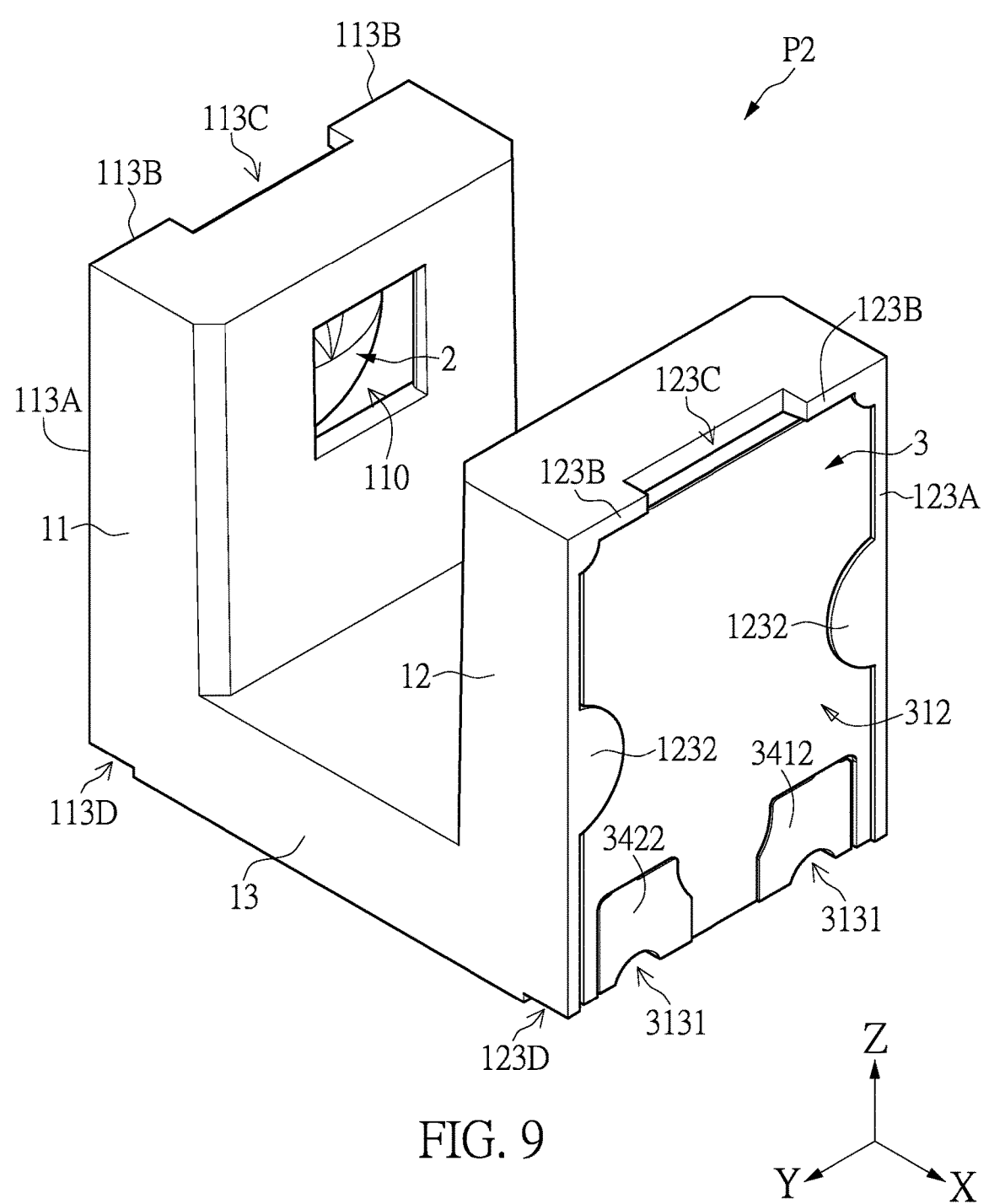
FIG. 9 is a schematic view of a photoelectric sensor according to a second embodiment of the present disclosure.
Figure 10:
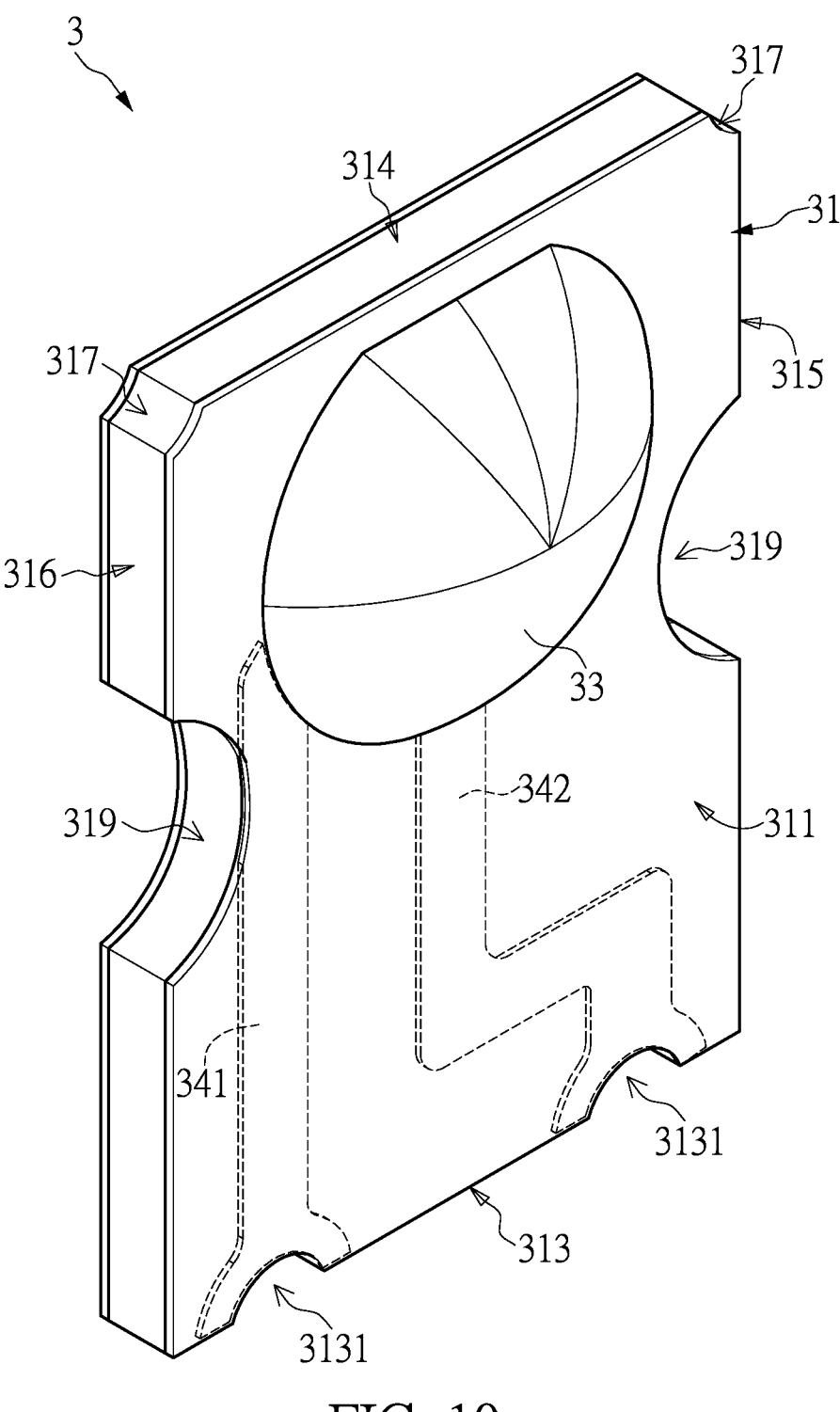
FIG. 10 is a schematic view of a circuit board according to the second embodiment of the present disclosure.
Figure 11:
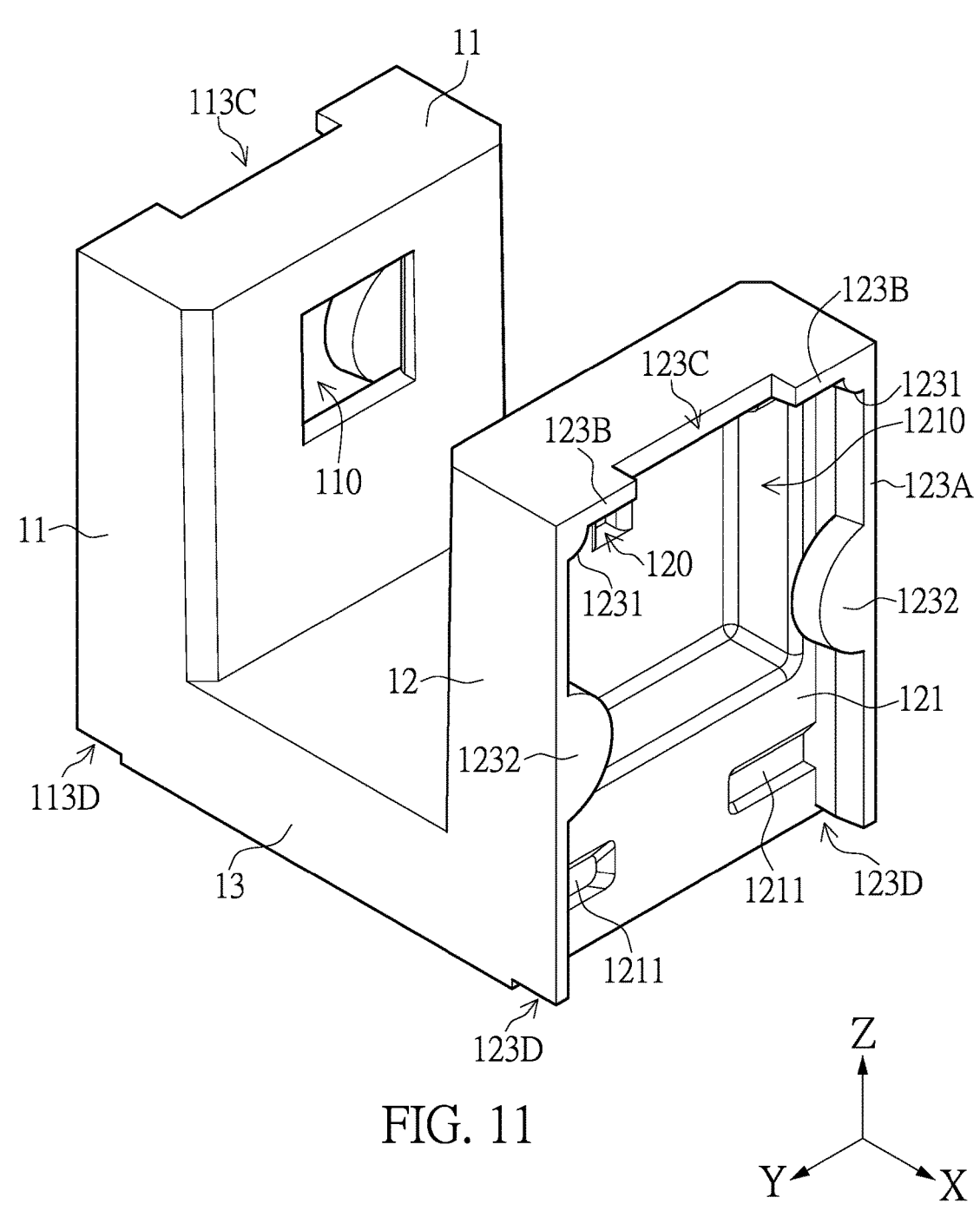
FIG. 11 is a schematic view of a housing according to the second embodiment of the present disclosure.

Referring to FIG. 9 to FIG. 11, FIG. 9 is a schematic view of a photoelectric sensor according to a second embodiment of the present disclosure, FIG. 10 is a schematic view of a circuit board according to the second embodiment of the present disclosure, and FIG. 11 is a schematic view of a housing according to the second embodiment of the present disclosure. The second embodiment of the present disclosure provides a photoelectric sensor P2, and the photoelectric sensor P2 of the second embodiment is similar in structure to the photoelectric sensor P1 of the first embodiment, and the similarities therebetween will not be reiterated herein. The main difference between the structure of the photoelectric sensor P2 of the second embodiment and that of the photoelectric sensor P1 of the first embodiment is that, the concave structure of the housing 1 and the structure of the circuit board are different in the photoelectric sensor P2.

For example, in the second concave structure 12C and the light-receiving module 3 of the photoelectric sensor P2, the first concave structure 11C and the second concave structure 12C have identical structures, the light-emitting module 2 and the light-receiving module 3 have identical structures, and the structures are not reiterated herein. The outer wall 123 of the second concave structure 12C further has two first fixing portions 1232, and the two first fixing portions 1232 are disposed on the two long portions 123A. The second circuit board 31 of the light-receiving module 3 has a first surface 311, a second surface 312, a third surface 313, a fourth surface 314, a fifth surface 315, and a sixth surface 316. The first surface 311 is opposite to the second surface 312. The third to sixth surfaces 313 to 316 are connected between the first surface 311 and the second surface 312. The third surface 313 has two recesses 3131 formed thereon, the third surface 313 is connected between the fifth surface 315 and the sixth surface 316, and the fourth surface 314 is connected between the fifth surface 315 and the sixth surface 316. The second light-permeable element 33, a first electrically conductive pattern 341, and a second electrically conductive pattern 342 are disposed on the first surface 311. A second end 3412 of the first electrically conductive pattern 341 passes through one of the two recesses 3131 and covers a surface of the one of the two recesses 3131, and a second end 3422 of the second conductive pattern 342 passes through another one of the two recesses 3131 and covers a surface of the another one of the two recesses 3131. Each of the fifth surface 315 and the sixth surface 316 has a second fixing portion 319 formed thereon. Furthermore, in the second embodiment, the concave structure of the housing does not have a limiting column.

Therefore, when the second circuit board 31 is embedded in the second concave structure 12C, the two second limiting portions 1231 are engaged with two first limiting portions 317 of the second circuit board 31, the second light-permeable element 33 is accommodated in the second accommodating cavity 1210, and the two first fixing portions 1232 are engaged with the two second fixing portions 319. In other words, by the design of the two second fixing portions 319 and the two first fixing portions 1232, the concave structure of the housing in the second embodiment limits the circuit board in a horizontal direction (the direction of the Y-axis) and a vertical direction (the direction of the Z-axis).

Third Embodiment

Figure 12:
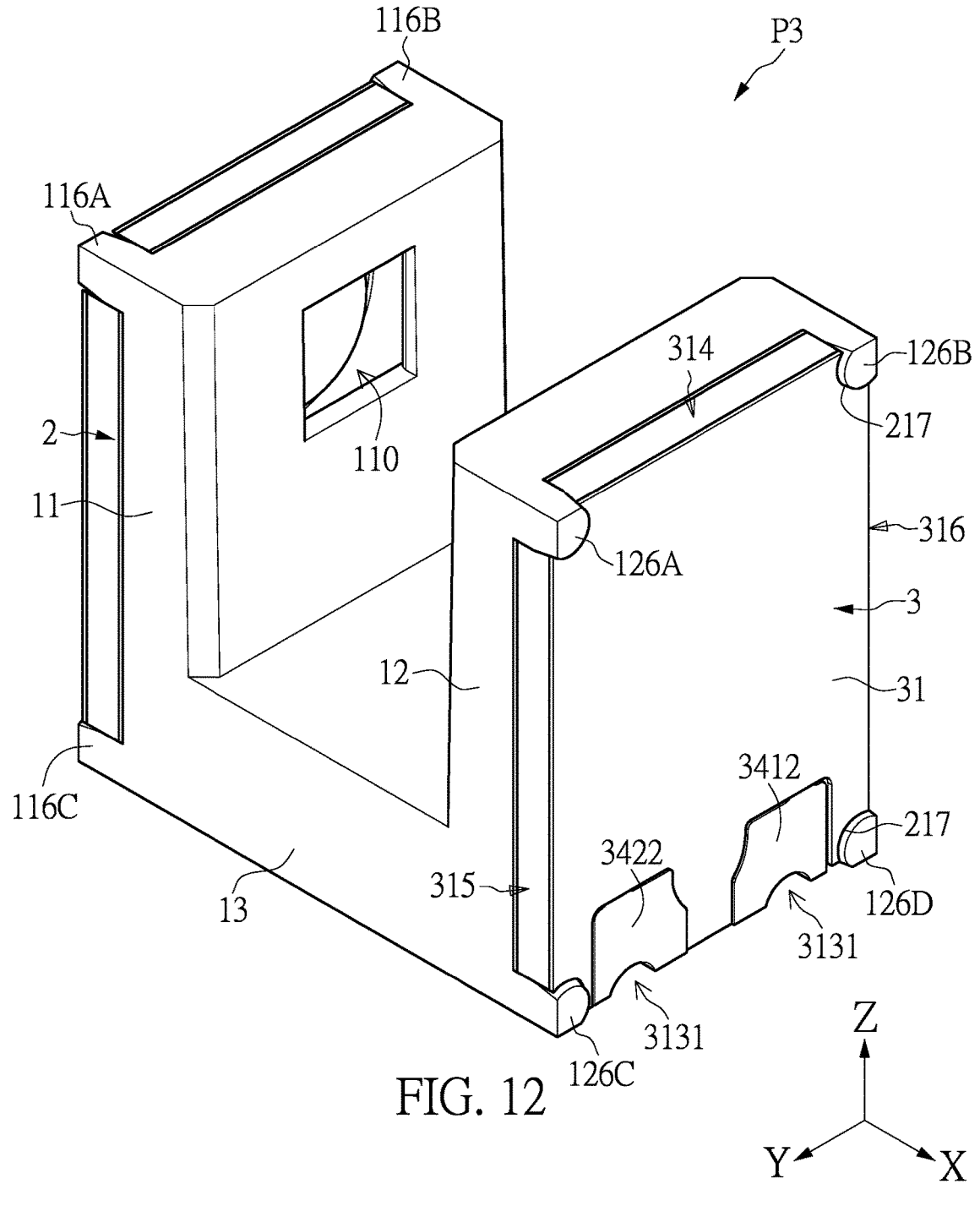
FIG. 12 is a schematic view of a photoelectric sensor according to a third embodiment of the present disclosure.
Figure 13:
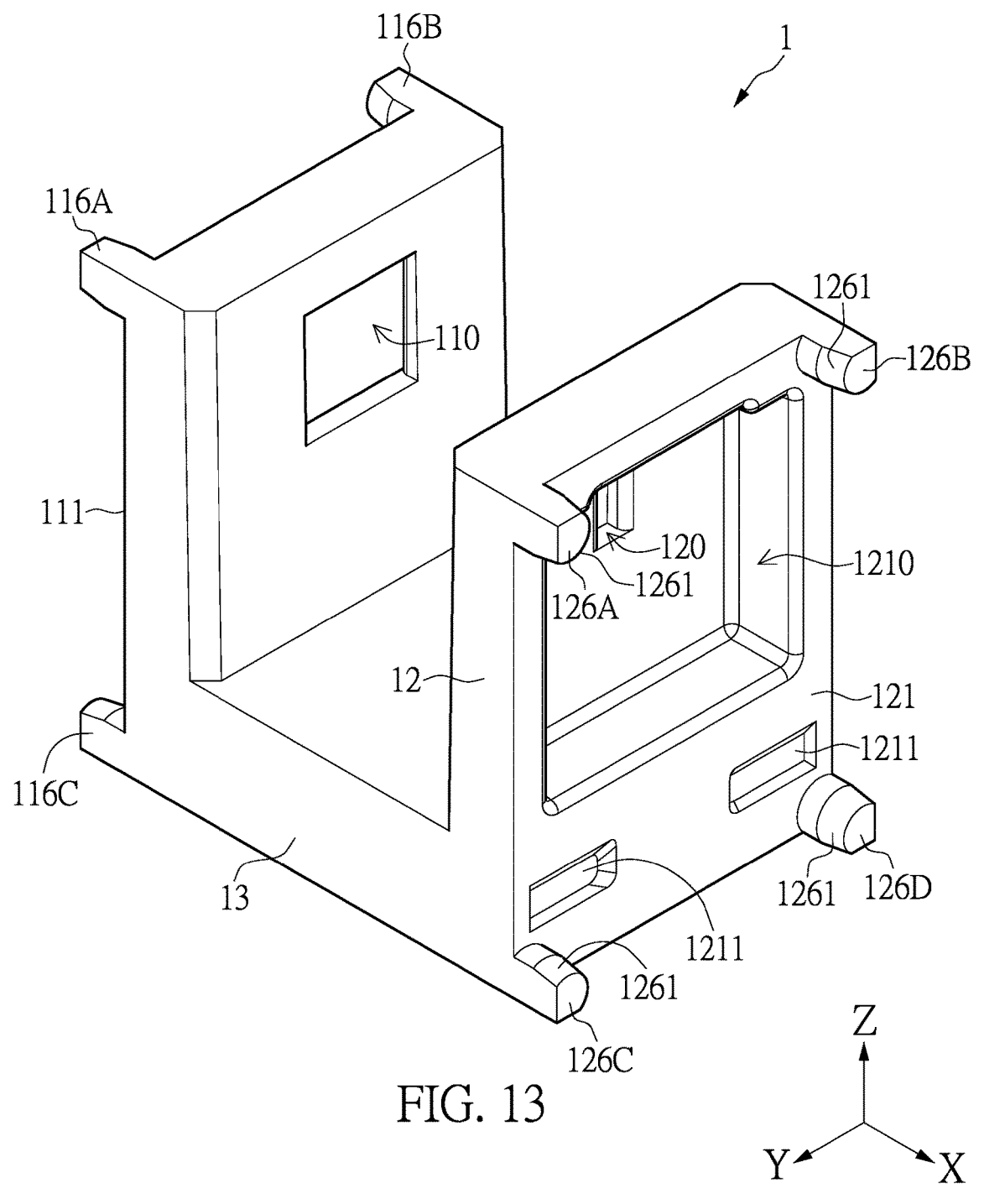
FIG. 13 is a schematic view of a housing according to the third embodiment of the present disclosure.

Referring to FIG. 12 and FIG. 13, FIG. 12 is a schematic view of a photoelectric sensor according to a third embodiment of the present disclosure, and FIG. 13 is a schematic view of a housing according to the third embodiment of the present disclosure. The third embodiment of the present disclosure provides a photoelectric sensor P3. The photoelectric sensor P3 of the third embodiment is similar in structure to the photoelectric sensor P1 of the first embodiment, and the similarities therebetween will not be reiterated herein. The main difference between the structure of the photoelectric sensor P3 of the third embodiment and that of the photoelectric sensor P1 of the first embodiment is that, in the third embodiment, limiting members of the housing include four columns at corners, and four limiting portions are formed at each of the four corners of the circuit board.

Specifically, the first upright portion 11 has a first opening 110 and four first columns. The four first columns are respectively disposed at the four corners of a side wall 111, and the first circuit board 21 is disposed between the four first columns. Due to the perspective of FIG. 12, only three first columns 116A, 116B, and 116C of the first upright portion 11 are shown in FIG. 12. Similarly, the second upright portion 12 has a second opening 120 and four second columns 126A, 126B, 126C, and 126D. The four second columns 126A, 126B, 126C, and 126D are respectively disposed at four corners of the side wall 121, and the second circuit board 21 is disposed between the four second columns 126A, 126B, 126C, and 126D.

The second circuit board 31 and the four second columns 126A, 126B, 126C, and 126D of the second upright portion 12 are further described herein. Each of the four second columns 126A, 126B, 126C, and 126D has a second limiting portion 1261. In addition, four first limiting portions 217 are respectively formed at the four corners of the second circuit board 31. Furthermore, the four first limiting portions 217 are formed between the fourth surface 314 and the fifth surface 315, between the fourth surface 314 and the sixth surface 316, between the third surface 313 and the fifth surface 315, and between the third surface 313 and the fifth surface 315 of the second circuit board 31, respectively. When the second circuit board 31 is fixed to the second upright portion 12, each of the second limiting portions 1261 is engaged with a corresponding one of the four first limiting portions 217, and the second light-permeable element 33 is accommodated in the second accommodating cavity 1210. Furthermore, the third surface 313, the fourth surface 314, the fifth surface 315, and the sixth surface 316 are aligned with outer surfaces of the side wall 121 of the second upright portion 12. It should be noted that, the first circuit board 21 and the four first columns of the first upright portion 11 have the same structure as in the above descriptions, and are not described in detail herein.

Beneficial Effects of the Embodiments

In conclusion, in the photoelectric sensor provided by the present disclosure, by forming a first concave structure and a second concave structure in the housing, the light-emitting module and the light-receiving module can be respectively embedded in the first concave structure and the second concave structure; and the light-emitting module and the light-receiving module can be bonded into the first and second concave structures by using adhesive members, the photoelectric sensor of the present disclosure can have improved structural strength compared to the existing photoelectric sensor. Furthermore, in the photoelectric sensor of the present disclosure, the light-emitting module and the light-receiving module are respectively embedded in the first concave structure and the second concave structure without sawing the housing. Each housing of the photoelectric sensor of the present disclosure has been singularized before assembling with the circuit board. Therefore, a manufacturing time can be shortened and a manufacturing cost can be saved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A photoelectric sensor, comprising:
a housing including a first upright portion, a second upright portion, and a base, wherein the first upright portion and the second upright portion are connected to the base, the first upright portion has a first concave structure and a first opening, and the second upright portion has a second concave structure and a second opening;
a light-emitting module including a first circuit board and a light-emitting element, wherein the light-emitting module is embedded in the first concave structure, and the light-emitting element corresponds to the first opening;
a light-receiving module including a second circuit board and a light-receiving element, wherein the light-receiving module is embedded in the second concave structure, and the light-receiving element corresponds to the second opening; and
two adhesive members being respectively provided on side walls of the first concave structure and the second concave structure, so as to respectively bond the light-emitting module into the first concave structure and the light-receiving module into the second concave structure.

2. The photoelectric sensor according to claim 1, wherein the light-emitting module includes a light-permeable element that is disposed on the first circuit board and covers the light-emitting element.

3. The photoelectric sensor according to claim 2, wherein the first concave structure has an accommodating cavity that corresponds to the first opening and accommodates the light-emitting element and the light-permeable element.

4. The photoelectric sensor according to claim 1, wherein the light-receiving module includes a light-permeable element that is disposed on the second circuit board and covers the light-receiving element.

5. The photoelectric sensor according to claim 4, wherein the second concave structure has an accommodating cavity that corresponds to the second opening and accommodates the light-receiving element and the light-permeable element.

6. The photoelectric sensor according to claim 1, wherein a size of the first opening is greater than a size of the second opening.

7. The photoelectric sensor according to claim 1, wherein the first upright portion has a first side surface, the second upright portion has a second side surface, and the base has a top surface; wherein the first side surface and the second side surface face each other, and the top surface is connected between the first side surface and the second side surface; wherein a top end of the first side surface and a top end of the second side surface have a first pitch therebetween, a junction between the first side surface and the top surface and a junction between the second side surface and the top surface have a second pitch therebetween, and the first pitch is equal to the second pitch.

8. The photoelectric sensor according to claim 1, wherein each of the first circuit board and the second circuit board has a first surface, a second surface, and a third surface, and the third surface is connected between the first surface and the second surface and has two recesses formed thereon.

9. The photoelectric sensor according to claim 8, wherein each of the first circuit board and the second circuit board further has a fourth surface, a fifth surface, and a sixth surface, the fourth surface is connected between the fifth surface and the sixth surface, and two first limiting portions are formed between the fourth surface and the fifth surface, and between the fourth surface and the sixth surface, respectively.

10. The photoelectric sensor according to claim 9, wherein the first concave structure and the second concave structure each has an outer wall, the outer wall has two long portions and a short portion, and the short portion is adjacent to a top portion of the housing.

11. The photoelectric sensor according to claim 10, wherein the short portion has a notch formed thereon.

12. The photoelectric sensor according to claim 10, wherein one end of each of the two long portions is connected to the short portion, and another end of each of the two long portions and a bottom portion of the housing have a step therebetween.

13. The photoelectric sensor according to claim 10, wherein each of the first concave structure and the second concave structure further includes a limiting column disposed at the side wall.

14. The photoelectric sensor according to claim 13, wherein the limiting column has an elliptical surface, a long axis of the elliptical surface is parallel to the two long portions; wherein each of the first circuit board and the second circuit board has a through-hole formed thereon, and the limiting column is inserted in the through-hole.

15. The photoelectric sensor according to claim 1, wherein the side wall of each of the first concave structure and the second concave structure further has two slots formed thereon.

16. The photoelectric sensor according to claim 10, wherein the outer wall further has two second limiting portions formed thereon, and the two second limiting portions are formed at junctions between the two long portions and the short portion and engaged with the two first limiting portions, respectively.

17. The photoelectric sensor according to claim 10, wherein the outer wall further has two first fixing portions respectively disposed on the two long portions, the fifth surface and the sixth surface of the first circuit board and the second circuit board respectively have two second fixing portions formed thereon, and the two first fixing portions are respectively engaged with the two second fixing portions.

* * * * *